US009806618B2

(12) United States Patent
Kidera et al.

(10) Patent No.: US 9,806,618 B2
(45) Date of Patent: Oct. 31, 2017

(54) POWER CONVERTING DEVICE AND POWER CONDITIONER USING THE SAME

(71) Applicant: Panasonic Intellectual Property Management Co., Ltd., Osaka (JP)

(72) Inventors: Kazunori Kidera, Osaka (JP); Mariko Kifuji, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/309,914

(22) PCT Filed: Apr. 17, 2015

(86) PCT No.: PCT/JP2015/002114
§ 371 (c)(1),
(2) Date: Nov. 9, 2016

(87) PCT Pub. No.: WO2015/174016
PCT Pub. Date: Nov. 19, 2015

(65) Prior Publication Data
US 2017/0155321 A1    Jun. 1, 2017

(30) Foreign Application Priority Data
May 12, 2014    (JP) .................................. 2014-098947

(51) Int. Cl.
*H02M 7/49*        (2007.01)
*H02M 7/5387*      (2007.01)
*H02M 3/158*       (2006.01)

(52) U.S. Cl.
CPC .......... *H02M 3/158* (2013.01); *H02M 7/5387* (2013.01)

(58) Field of Classification Search
CPC ........ H02M 1/36; H02M 7/5375; H02M 7/44; H02M 7/48; H02M 7/483; H02M 7/49;
(Continued)

(56) References Cited

U.S. PATENT DOCUMENTS 8,542,505 B2 * 9/2013 Jiang-Hafner ........ H02M 7/483
                                                  363/40
9,001,544 B2 * 4/2015 Itoh ...................... H02M 7/483
                                                  363/132
(Continued)

FOREIGN PATENT DOCUMENTS

DE   10 2012 005 974 A1   9/2013
JP         4369425 B2      9/2009
(Continued)

OTHER PUBLICATIONS

International Search Report for corresponding International Application No. PCT/JP2015/002114 dated Jul. 14, 2015.
(Continued)

Primary Examiner — Gary L Laxton
(74) Attorney, Agent, or Firm — Renner Otto Boisselle & Sklar, LLP

(57) ABSTRACT

A first conversion circuit is electrically connected between a reference potential point and a first input point on a high potential side of a direct current power supply. A second conversion circuit is electrically connected between the reference potential point and a second input point on a low potential side of the direct current power supply. A voltage-regulating circuit is configured to adjust a magnitude of an applied voltage to the first conversion circuit and the second conversion circuit. The voltage-regulating circuit is configured to increase the magnitude of the applied voltage over time during a start time period from a start of supplying power from the direct current power supply until a first capacitor and a second capacitor are charged to a specified voltage.

8 Claims, 10 Drawing Sheets

(58) Field of Classification Search
CPC ............... H02M 7/5387; H02M 7/42; H02M 2007/4835
See application file for complete search history.

(56) References Cited

U.S. PATENT DOCUMENTS

| | | | |
|---|---|---|---|
| 9,042,142 B2* | 5/2015 | Guan | G05F 3/08 363/132 |
| 9,571,006 B2* | 2/2017 | Stahl | H02M 7/483 |
| 2007/0025126 A1 | 2/2007 | Barbosa et al. | |
| 2014/0063884 A1 | 3/2014 | Itoh et al. | |
| 2015/0009734 A1 | 1/2015 | Stahl et al. | |
| 2015/0311822 A1 | 10/2015 | Ma et al. | |
| 2016/0049884 A1* | 2/2016 | Tamai | H02M 7/483 363/95 |

FOREIGN PATENT DOCUMENTS

| | | |
|---|---|---|
| JP | 2011-083115 A | 4/2011 |
| JP | 2014-50134 A | 3/2014 |
| JP | 2014-064431 A | 4/2014 |
| WO | WO 2013/005804 A1 | 1/2013 |
| WO | WO 2014/061519 A1 | 4/2014 |

OTHER PUBLICATIONS

Form PCT/ISA/237 for corresponding International Application No. PCT/JP2015/002114 dated Jul. 14, 2015.

* cited by examiner

US 9,806,618 B2

POWER CONVERTING DEVICE AND POWER CONDITIONER USING THE SAME

TECHNICAL FIELD

The present invention generally relates to power-converting devices and power conditioners using the same, and more specifically to a power-converting device for converting power from a direct current power supply and a power conditioner using the same.

BACKGROUND ART

Along with recent widespread use of photovoltaic generators, fuel cells, power storage apparatuses, and other such apparatuses for dwellings, various circuits have been proposed and provided as power-converting devices for converting outputs from direct current power supplies of such apparatuses into alternate currents. For example, JP 2014-64431 A (paragraphs [0002] to [0006], FIGS. 16 and 17, hereinafter referred to as Document 1) and JP 4369425 B2 (hereinafter referred to as Document 2) disclose a power-converting device ("multilevel power conversion device" in Document 1, "converter circuit" in Document 2) configured to generate alternate current outputs at a plurality of voltage levels by converting voltages from a direct-current voltage source.

According to the description of Document 1, the power conversion device is a five-level inverter configured to output voltages at five levels and includes two direct current capacitors, two flying capacitors, and ten switching elements. This power conversion device controls each switching element such that the voltage of each direct current capacitor is E/2 and the voltage of each flying capacitor is E/4 with a direct-current voltage E being applied to a series circuit of the two direct current capacitors, thereby outputting voltages at five levels.

The power-converting devices described in Documents 1 and 2 each have to withstand a voltage of E/4 because each switching element performs switching of the voltage E/4 in regular operation to output voltages in five levels as described above. However, a larger voltage may be applied to each switching element in a state where the flying capacitor is not charged than in the regular operation. Therefore, each switching element has to have a higher withstand voltage than a withstand voltage required in the regular operation. That is, the switching element of the power-converting device has to have a relatively high withstand voltage.

SUMMARY OF INVENTION

In view of the foregoing, it is an object of the present invention to provide a power-converting device including a switching element whose withstand voltage can be reduced and to provide a power conditioner including the power-converting device.

A power-converting device according to one aspect of the present invention includes a first conversion circuit electrically connected between a reference potential point and a first input point on a high potential side of a direct current power supply; a second conversion circuit electrically connected between the reference potential point and a second input point on a low potential side of the direct current power supply; and a voltage-regulating circuit configured to adjust a magnitude of an applied voltage to the first conversion circuit and the second conversion circuit, wherein the first conversion circuit includes first to fourth switching elements electrically connected in series with each other between the first input point and the reference potential point in an order of the first switching element, the second switching element, the third switching element, and the fourth switching element from the first input point, and a first capacitor electrically connected in parallel with a series circuit of the second switching element and the third switching element, the first conversion circuit switches a magnitude of a voltage generated between the reference potential point and a first output point between three stages which are zero, a first level, and a second level, the first output point being a connection point of the second switching element and the third switching element, the second conversion circuit includes fifth to eighth switching elements electrically connected in series with each other between the reference potential point and the second input point in an order of the fifth switching element, the sixth switching element, the seventh switching element, and the eighth switching element from the reference potential point, and a second capacitor electrically connected in parallel with a series circuit of the sixth switching element and the seventh switching element, the second conversion circuit switches a magnitude of a voltage generated between the reference potential point and a second output point between three stages which are zero, a third level, and a fourth level, the second output point being a connection point of the sixth switching element and the seventh switching element, and the voltage-regulating circuit is configured to increase the magnitude of the applied voltage over time during a start time period from a start of supplying power from the direct current power supply until the first capacitor and the second capacitor are charged to a specified voltage.

A power conditioner according to one aspect of the present invention includes: the power-converting device; and a disconnection device electrically connected between a system power supply and each of the first output point and the second output point, wherein the disconnection device is configured to be open during the start time period to keep a state where the first output point and the second output point are disconnected from the system power supply.

The configuration according to the above aspect enables the withstand voltage of the switching element to be reduced.

BRIEF DESCRIPTION OF DRAWINGS

The figures depict one or more implementations in accordance with the present teaching, by way of example only, not by way of limitations. In the figures, like reference numerals refer to the same or similar elements.

DESCRIPTION OF EMBODIMENTS (First Embodiment)

Figure 1:
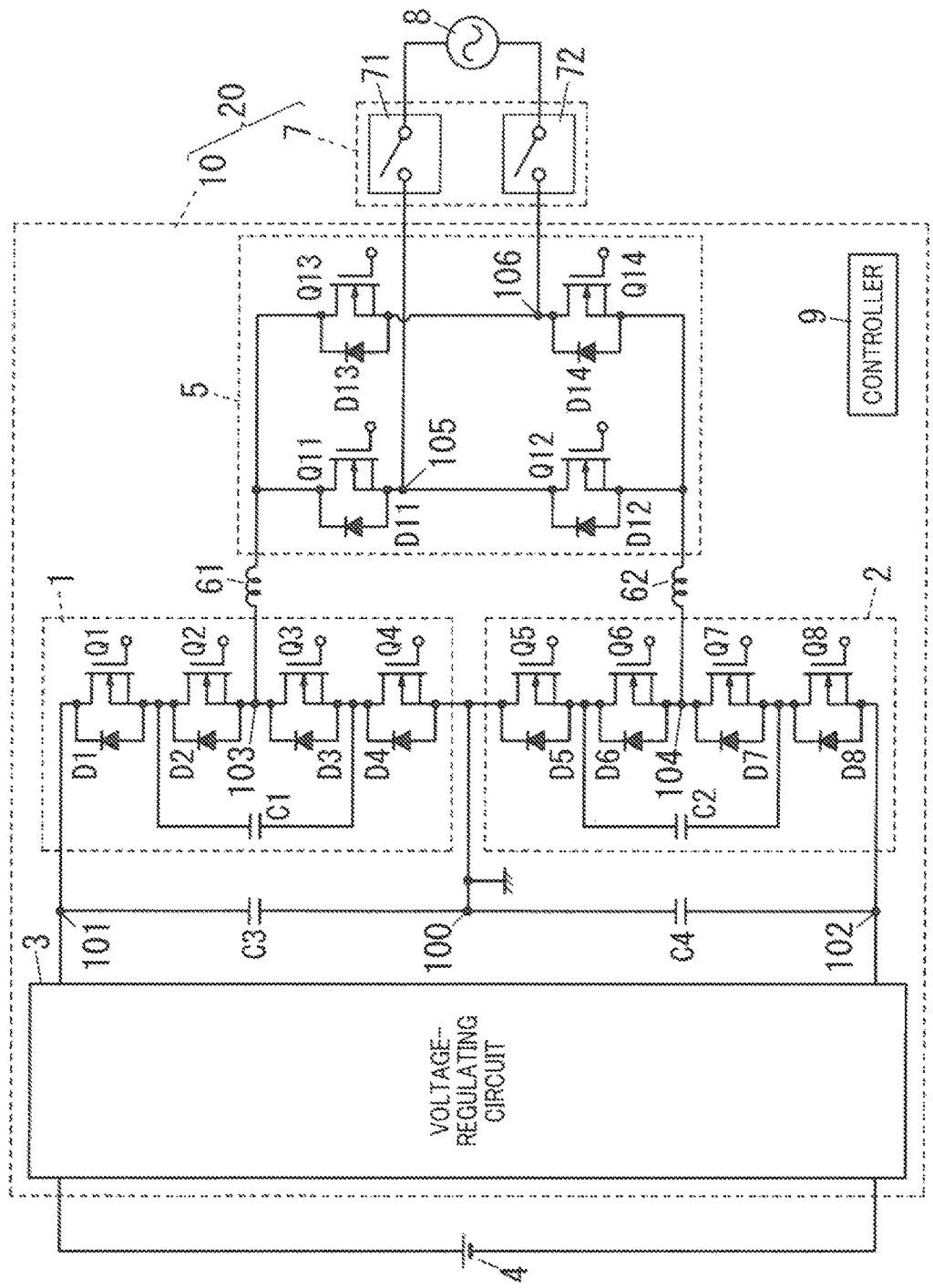
FIG. 1 is a circuit diagram illustrating the configuration of a power conditioner according to a first embodiment.

As illustrated in FIG. 1, a power-converting device 10 according to the present embodiment includes a first conversion circuit 1, a second conversion circuit 2, and a voltage-regulating circuit 3.

The first conversion circuit 1 is electrically connected between a reference potential point 100 and a first input point 101 on a high potential side of a direct current power supply 4. The second conversion circuit 2 is electrically connected between the reference potential point 100 and a second input point 102 on a low potential side of the direct current power supply 4. The voltage-regulating circuit 3 is configured to adjust the magnitude of an applied voltage to the first conversion circuit 1 and the second conversion circuit 2.

The first conversion circuit 1 includes first to fourth switching elements Q1 to Q4 and a first capacitor C1. The first to fourth switching elements Q1 to Q4 are electrically connected in series with each other between the first input point 101 and the reference potential point 100. The first to fourth switching elements Q1 to Q4 are connected in series with each other in the order of the first switching element Q1, the second switching element Q2, the third switching element Q3, and the fourth switching element Q4 from the first input point 101.

The first capacitor C1 is electrically connected in parallel with a series circuit of the second switching element Q2 and the third switching element Q3.

The first conversion circuit 1 has a first output point 103 which is a connection point of the second switching element Q2 and the third switching element Q3. The first conversion circuit 1 switches the magnitude of a voltage generated between the first output point 103 and the reference potential point 100 between three stages which are zero, a first level, and a second level.

The second conversion circuit 2 includes fifth to eighth switching elements Q5 to Q8 and a second capacitor C2. The fifth to eighth switching elements Q5 to Q8 are electrically connected in series with each other between the reference potential point 100 and the second input point 102. The fifth to eighth switching elements Q5 to Q8 are connected in series with each other in the order of the fifth switching element Q5, the sixth switching element Q6, the seventh switching element Q7, and the eighth switching element Q8 from the reference potential point 100.

The second capacitor C2 is electrically connected in parallel with a series circuit of the sixth switching element Q6 and the seventh switching element Q7.

The second conversion circuit 2 includes a second output point 104 which is a connection point of the sixth switching element Q6 and the seventh switching element Q7. The second conversion circuit 2 switches the magnitude of a voltage generated between the reference potential point 100 and the second output point 104 between three stages which are zero, a third level, and a fourth level.

The voltage-regulating circuit 3 is configured to increase the magnitude of the applied voltage over time during a start time period T1 (see FIG. 10) from a start of power supply from the direct current power supply 4 until the first capacitor C1 and the second capacitor C2 are charged to a specified voltage.

That is, the power-converting device 10 according to the present embodiment includes the voltage-regulating circuit 3 to gradually increase the applied voltage to the first conversion circuit 1 and the second conversion circuit 2 during the start time period T1 immediately after turning on of the direct current power supply 4. That is, until the first capacitor C1 and the second capacitor C2 are charged to the specified voltage, the applied voltage to the first conversion circuit 1 and the second conversion circuit 2 is kept low, thereby keeping a voltage applied to each of the first to eighth switching elements Q1 to Q8 low. With the power-converting device 10, the withstand voltages of the switching elements (Q1 to Q8) can be reduced. That is, switching elements having relatively low withstand voltages can be used.

A mechanism through which the voltage applied to each of the first to eighth switching elements Q1 to Q8 is kept low will be described later with reference to FIG. 10.

As illustrated in FIG. 1, the power conditioner 20 according to the present embodiment includes the power-converting device 10 and a disconnection device 7. The disconnection device 7 is electrically connected between a system power supply 8 and each of the first output point 103 and the second output point 104. The disconnection device 7 is configured to be open during the start time period T1 to keep a state where the first output point 103 and the second output point 104 are disconnected (paralleled off) from the system power supply 8.

The power conditioner 20 opens (disconnects) the disconnection device 7 to allow the first conversion circuit 1 and the second conversion circuit 2 to be electrically disconnected from the system power supply 8. Thus, the power conditioner 20 keeps the disconnection device 7 open during the start time period T1 to apply no voltage from the system power supply 8 to the first to eighth switching elements Q1 to Q8, and therefore, the voltage applied to each of the first to eighth switching elements Q1 to Q8 is kept low.

The power-converting device 10 according to the present embodiment and the power conditioner 20 including the power-converting device 10 will be described in detail below. Note that the following configurations are mere examples of the present invention. The present invention is not limited to the present embodiment (first embodiment) and the following embodiments (second embodiment). Even in embodiments other than these embodiments, various modifications may be made depending on design, and the like without departing from the technical idea of the present invention.

In the present embodiment, an example is illustrated in which the power conditioner 20 is a power conditioner used for dwellings by being electrically connected to a photovoltaic generator serving as the direct current power supply 4. However, this example does not intend to limit the application of the power conditioner 20. The power conditioner 20 may be used in electrical connection with a direct current power supply 4 such as a fuel cell or a power storage apparatus for dwellings other than the photovoltaic generator. The power conditioner 20 may also be used in, for example, shops, factories, and offices other than dwellings.

The application of the power-converting device 10 is not limited to the power conditioner 20. The power-converting device 10 may be used in apparatuses other than the power conditioner 20.

<Configuration of Power-Converting Device>

As illustrated in FIG. 1, the power-converting device 10 of the present embodiment is electrically connected to the direct current power supply 4, which is a photovoltaic generator, via a junction box. In the present embodiment, the power-converting device 10 includes the first conversion circuit 1, the second conversion circuit 2, and the voltage-regulating circuit 3, and further includes a third capacitor C3, a fourth capacitor C4, a third conversion circuit 5, inductors 61 and 62, and a controller 9.

The first output point 103 of the first conversion circuit 1 and the second output point 104 of the second conversion circuit 2 are electrically connected to the system power supply (commercial power grid) 8 via the inductors 61 and 62, respectively, the third conversion circuit 5, and the disconnection device 7 included in the power conditioner 20. Specifically, an output of the power conditioner 20 (an output of the third conversion circuit 5) is electrically connected to an interconnection breaker disposed on the distribution board via the disconnection device 7 and is thereby connected to the system power supply 8.

The power conditioner 20 performs grid-connected operation in a regular state with the disconnection device 7 being in a closed state to convert direct current power input from the direct current power supply 4 into alternate-current power and to output the alternate-current power. The configuration of the power conditioner 20 is not described in detail, but the power conditioner 20 is configured to keep the disconnection device 7 open in an abnormal state such as a power outage of the system power supply 8 so as to perform autonomous operation of outputting the alternate current power while being disconnected from the system power supplies 8.

The disconnection device 7 includes a first contact point 71 and a second contact point 72. The first contact point 71 is electrically connected between the system power supply 8 and one (a third output point 105) of output ends of the third conversion circuit 5. The second contact point 72 is electrically connected between the system power supply 8 and the remaining output end (a fourth output point 106) of the third conversion circuit 5. The disconnection device 7 is only required to be electrically connected between the system power supply 8 and at least one of the third output point 105 and the fourth output point 106. One of the first contact point 71 and the second contact point 72 may be omitted.

The configuration of each component of the power-converting device 10 will now be described in detail.

The voltage-regulating circuit 3 is electrically connected between the direct current power supply 4 and a series circuit of the first conversion circuit 1 and the second conversion circuit 2. This configuration allows a direct-current voltage output from the direct current power supply 4 to be applied as an applied voltage to the first conversion circuit 1 and the second conversion circuit 2 via the voltage-regulating circuit 3. The voltage-regulating circuit 3 has a pair of output ends individually corresponding to the first input point 101 and the second input point 102.

The voltage-regulating circuit 3 increases the magnitude of the applied voltage between the first input point 101 and the second input point 102 over time during the start time period T1 (see FIG. 10) until the first capacitor C1 and the second capacitor C2 are charged to the specified voltage. The specific configuration of the voltage-regulating circuit 3 will be described later.

The third capacitor C3 and the fourth capacitor C4 are electrically connected in series with each other between the first input point 101 and the second input point 102. That is, a series circuit of the third capacitor C3 and the fourth capacitor C4 is connected between the output ends of the voltage-regulating circuit 3. The circuit constant (capacitance) of the third capacitor C3 is equivalent in value to the circuit constant (capacitance) of the fourth capacitor C4.

The output voltage of the voltage-regulating circuit 3 is divided by the third capacitor C3 and the fourth capacitor C4. Therefore, when the voltage-regulating circuit 3 directly outputs an input voltage from the direct current power supply 4, the voltage across each of the third capacitor C3 and the fourth capacitor C4 is represented by E/2[V] by using the output voltage E[V] of the direct current power supply 4.

The connection point of the third capacitor C3 and the fourth capacitor C4 is the reference potential point 100. The reference potential point 100 is assumed to be circuit ground and to have a potential of 0[V]. In this case, when the voltage across each of the third capacitor C3 and the fourth capacitor C4 is E/2[V], the potential of the first input point 101 is E/2[V], and the potential of the second input point 102 is −E/2[V].

As described above, the first conversion circuit 1 includes the first to fourth switching elements Q1 to Q4 and the first capacitor C1. The first to fourth switching elements Q1 to Q4 are connected in series with each other between the first input point 101 and the reference potential point 100. In other words, the series circuit of the first to fourth switching elements Q1 to Q4 is connected in parallel with the third capacitor C3 between the first input point 101 and the reference potential point 100. Here, each of the first to fourth switching elements Q1 to Q4 is, for example, a depletion type n-channel Metal-Oxide-Semiconductor Field Effect Transistor (MOSFET).

The drain of the first switching element Q1 is electrically connected to the first input point 101. The drain of the second switching element Q2 is electrically connected to the source of the first switching element Q1. The drain of the third switching element Q3 is electrically connected to the source of the second switching element Q2. The drain of the fourth switching element Q4 is electrically connected to the source of the third switching element Q3. The source of the fourth switching element Q4 is electrically connected to the reference potential point 100. The connection point of the source of the second switching element Q2 and the drain of the third switching element Q3 is the first output point 103.

The first capacitor C1 has its one end electrically connected to the drain of the second switching element Q2 and its other end electrically connected to the source of the third switching element Q3. In other words, one end of the first capacitor C1 is electrically connected to the first input point 101 via the first switching element Q1, and the other end of the first capacitor C1 is electrically connected to the reference potential point 100 via the fourth switching element Q4.

As described above, the second conversion circuit 2 includes the fifth to eighth switching elements Q5 to Q8 and the second capacitor C2. The fifth to eighth switching elements Q5 to Q8 are connected in series with each other between the reference potential point 100 and the second input point 102. The second conversion circuit 2 has basically the same configuration as the first conversion circuit 1, wherein the fifth to eighth switching elements Q5 to Q8 correspond to the first to fourth switching elements Q1 to Q4, and the second capacitor C2 corresponds to the first capacitor C1.

That is, a series circuit of the fifth to eighth switching elements Q5 to Q8 is connected in parallel with the fourth capacitor C4 between the reference potential point 100 and the second input point 102. Each of the fifth to eighth switching elements Q5 to Q8 is a depletion type n-channel MOSFET as in the case of each of the first to fourth switching elements Q1 to Q4.

The drain of the fifth switching element Q5 is electrically connected to the reference potential point 100. The drain of the sixth switching element Q6 is electrically connected to the source of the fifth switching element Q5. The drain of the seventh switching element Q7 is electrically connected to the source of the sixth switching element Q6. The drain of the eighth switching element Q8 is electrically connected to the source of the seventh switching element Q7. The source of the eighth switching element Q8 is electrically connected to the second input point 102. The connection point of the source of the sixth switching element Q6 and the drain of the seventh switching element Q7 is the second output point 104.

The second capacitor C2 has its one end electrically connected to the drain of the sixth switching element Q6 and its other end electrically connected to the source of the seventh switching element Q7. In other words, one end of the second capacitor C2 is electrically connected to the reference potential point 100 via the fifth switching element Q5 and the other end of the second capacitor C2 is electrically connected to the second input point 102 via the eighth switching element Q8. The circuit constant (capacitance) of the second capacitor C2 is equivalent to the circuit constant (capacitance) of the first capacitor C1.

In FIG. 1, first to eighth diodes D1 to D8 are connected in anti-parallel with the first to eighth switching elements Q1 to Q8 on a one-to-one basis. These first to eighth diodes D1 to D8 are parasitic diodes of the first to eighth switching elements Q1 to Q8, respectively. That is, the parasitic diode of the first switching element Q1 is the first diode D1, and in a similar manner, the parasitic diodes of the second switching element Q2, the third switching element Q3, . . . are respectively the second diode D2, the third diode D3, . . . . For example, the first diode D1 is connected with its cathode and anode respectively facing the drain and the source of the first switching element Q1.

The third conversion circuit 5 is electrically connected between the first output point 103 and the second output point 104 and includes first to fourth switches Q11 to Q14 in a full bridge configuration. The third conversion circuit 5 is configured to convert a voltage generated between the first output point 103 and the second output point 104 into an alternate current voltage and to output the alternate current voltage.

Specifically, a series circuit of the first switch Q11 and the second switch Q12 and a series circuit of the third switch Q13 and the fourth switch Q14 are connected in parallel with each other between the first output point 103 and the second output point 104. In the third conversion circuit 5, a connection point of the first switch Q11 and the second switch Q12 is the third output point 105, and a connection point of the third switch Q13 and the fourth switch Q14 is the fourth output point 106. The third output point 105 and the fourth output point 106 are the output ends of the third conversion circuit 5. Each of the first to fourth switches Q11 to Q14 is a depletion type n-channel MOSFET as in the case of each of the first to eighth switching elements Q1 to Q8.

In FIG. 1, ninth to twelfth diodes D11 to D14 are connected in anti-parallel with the first to fourth switches Q11 to Q14 on a one-to-one basis. These ninth to twelfth diodes D11 to D14 are parasitic diodes of the first to fourth switches Q11 to Q14, respectively. That is, the parasitic diode of the first switch Q11 is the ninth diode D11, and in similar manner, the parasitic diodes of the second, third, and fourth switches Q12, Q13, and Q14 are respectively the tenth, eleventh, and twelfth diodes D12, D13, and D14.

Moreover, the first to eighth switching elements Q1 to Q8 and the first to fourth switches Q11 to Q14 each have a gate electrically connected to the controller 9. The controller 9 is capable of individually switching on/off the first to fourth switching elements Q1 to Q4, thereby controlling the first conversion circuit 1. The controller 9 is capable of individually switching on/off the fifth to eighth switching elements Q5 to Q8, thereby controlling the second conversion circuit 2. The controller 9 is capable of individually switching on/off the first to fourth switches Q11 to Q14, thereby controlling the third conversion circuit 5.

Note that controllers 9 may be individually provided to the first conversion circuit 1, the second conversion circuit 2, and the third conversion circuit 5.

The power-converting device 10 includes the pair of inductors 61 and 62. The inductor 61 is electrically connected between the first output point 103 and the third conversion circuit 5. The inductor 62 is electrically connected between the second output point 104 and the third conversion circuit 5. Note that it is only required that the inductor 61 is electrically connected between the first output point 103 and the third conversion circuit 5 or that the inductor 62 is electrically connected between the second output point 104 and the third conversion circuit 5. One of the inductors 61 and 62 may be omitted.

<Basic Operation of Power-Converting Device>

Basic operation of the power-converting device 10 having the above-described configuration will be briefly described with reference to FIGS. 2A, 2B, 3A, 3B, 4A, 4B, 5A, and 5B. In the figures, the bold arrows represent current paths.

The basic operation of the power-converting device 10 here means operation of the power-converting device 10 after the start time period T1 has elapsed, that is, after the first capacitor C1 and the second capacitor C2 have been charged to the specified voltage. The specified voltage for the first capacitor C1 is a half (½) of the voltage across the third capacitor C3, and the specified voltage for the second capacitor C2 is a half (½) of the voltage across the fourth capacitor C4.

It is assumed hereinafter that in the basic operation of the power-converting device 10, the voltage-regulating circuit 3 directly outputs the output voltage E[V] of the direct current power supply 4. Therefore, the voltage across each of the third capacitor C3 and the fourth capacitor C4 is E/2[V], the potential of the first input point 101 is E/2[V], and the potential of the second input point 102 is −E/2[V]. The voltage across each of the first capacitor C1 and the second capacitor C2 which has been charged to the specified voltage is E/4[V]. The third output point 105 and the fourth output point 106 are electrically connected to the system power supply 8 via the disconnection device 7, and therefore, the potential difference between the third output point 105 and the fourth output point 106 equals the output voltage of the system power supply 8.

The power-converting device 10 switches the first conversion circuit 1, the second conversion circuit 2, and the third conversion circuit 5 between first to eight, i.e., a total of eight modes, thereby converting a direct-current voltage (E[V]) applied between the first input point 101 and the second input point 102 into an alternate current voltage to output the alternate current voltage from the third conversion circuit 5. In the following description, the first to eighth switching elements Q1 to Q8 and the first to fourth switches Q11 to Q14 are in an "off" state unless otherwise stated as to their on/off states.

Figure 2A:
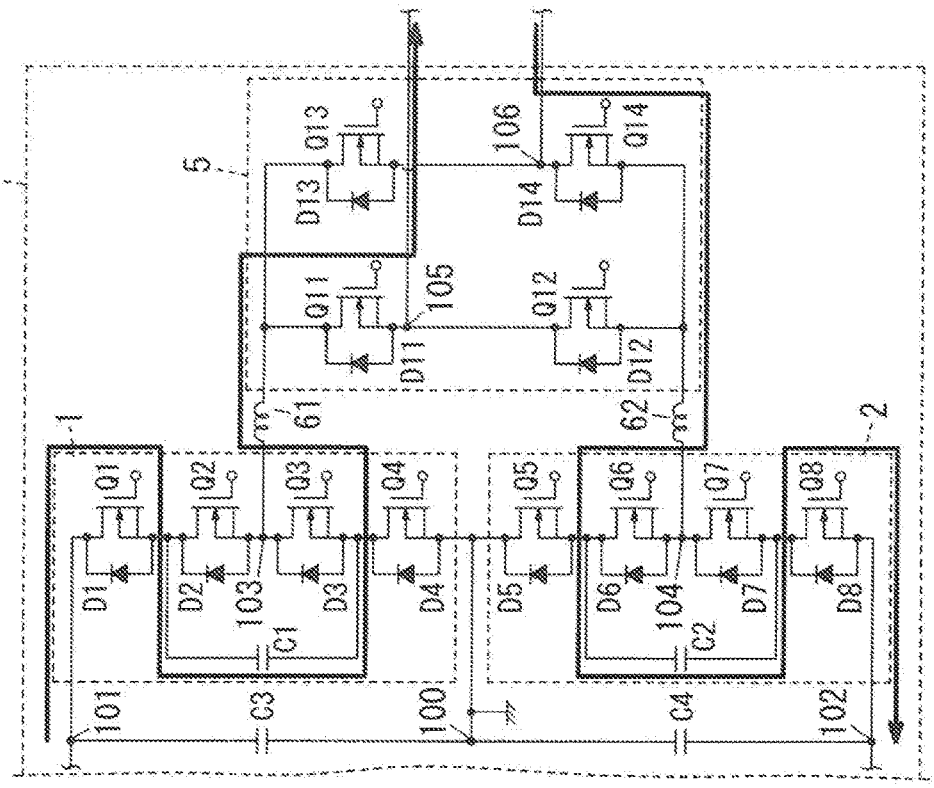
FIGS. 2A and 2B are views illustrating operation of a power-converting device according to the first embodiment.

First, in the first mode illustrated in FIG. 2A, the first and second switching elements Q1 and Q2 of the first conversion circuit 1 and the seventh and eighth switching elements Q7 and Q8 of the second conversion circuit 2 and the first and fourth switches Q11 and Q14 of the third conversion circuit 5 are in the on state. In this state, as illustrated in FIG. 2A, the first input point 101 is electrically connected to the third output point 105 via the first switching element Q1, the second switching element Q2, the inductor 61, and the first switch Q11. The second input point 102 is electrically connected to the fourth output point 106 via the eighth switching element Q8, the seventh switching element Q7, the inductor 62, and the fourth switch Q14.

Thus, the first output point 103 has the same potential (E/2[V]) as the first input point 101, and the second output point 104 has the same potential (−E/2[V]) as the second input point 102. In this case, the potential of the third output point 105 is a potential obtained by subtracting the voltage across the inductor 61 from the potential of the first output point 103, and the potential of the fourth output point 106 is a potential obtained by adding a voltage across the inductor 62 to the potential of the second output point 104.

Figure 2B:
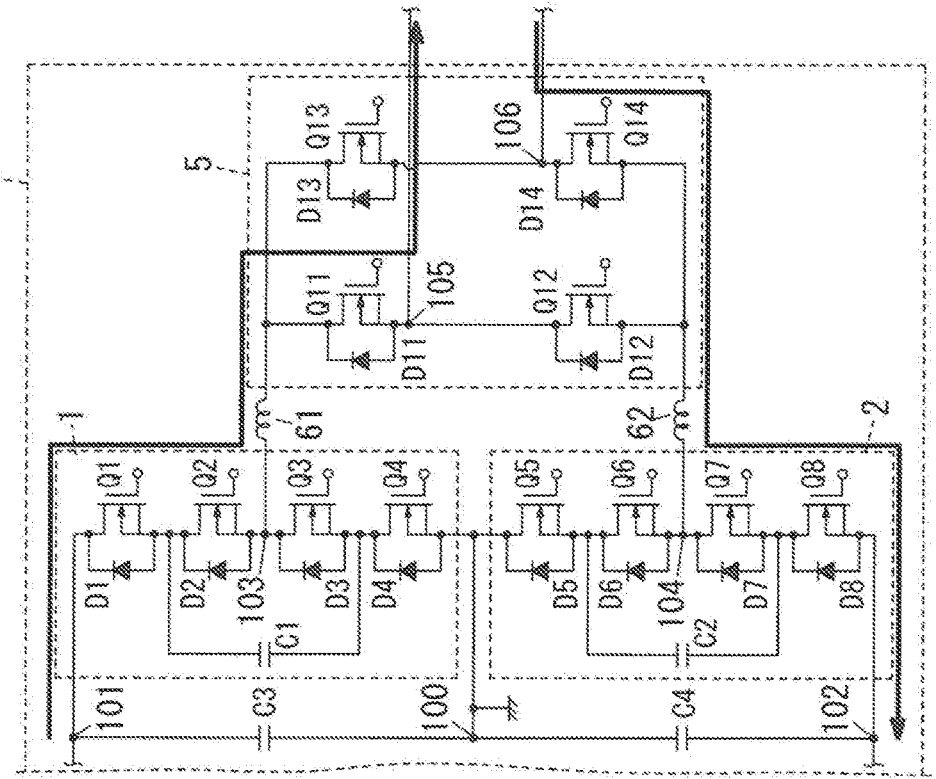

Next, in the second mode illustrated in FIG. 2B, the first and third switching elements Q1 and Q3 of the first conversion circuit 1, the sixth and eighth switching elements Q6 and Q8 of the second conversion circuit 2, and the first and fourth switches Q11 and Q14 of the third conversion circuit 5 are in the on state. In this state, as illustrated in FIG. 2B, the first input point 101 is electrically connected to the third output point 105 via the first switching element Q1, the first capacitor C1, the third switching element Q3, the inductor 61, and the first switch Q11. Moreover, the second input point 102 is electrically connected to the fourth output point 106 via the eighth switching element Q8, the second capacitor C2, the sixth switching element Q6, the inductor 62, and the fourth switch Q14.

Therefore, in the second mode, the potential of the first output point 103 is lower than the potential (E/2[V]) of the first input point 101 by the voltage (E/4[V]) across the first capacitor C1, that is, the potential of the first output point 103 is E/4 (=E/2−E/4)[V]. Moreover, in the second mode, the potential of the second output point 104 is higher than the potential (−E/2[V]) of the second input point 102 by the voltage (E/4[V]) across the second capacitor C2, that is, the potential of the second output point 104 is −E/4 (=−E/2+E/4)[V]. In this case, the potential of the third output point 105 is a potential obtained by subtracting the voltage across the inductor 61 from the potential of the first output point 103, and the potential of the fourth output point 106 is a potential obtained by adding the voltage across the inductor 62 to the potential of the second output point 104.

Figure 3A:
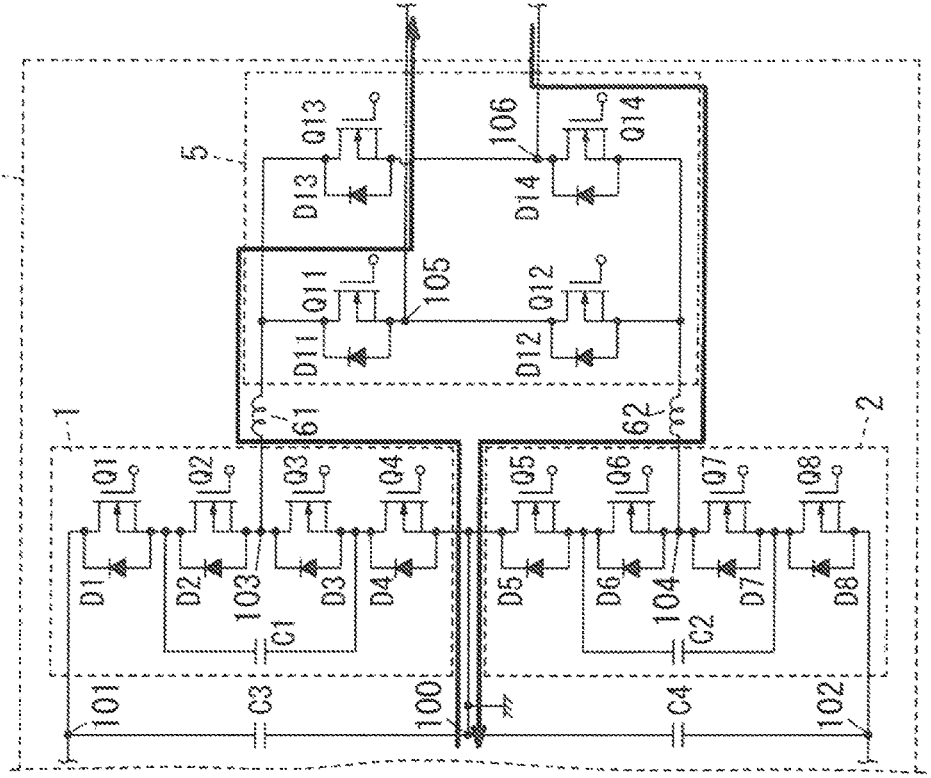
FIGS. 3A and 3B are views illustrating the operation of the power-converting device according to the first embodiment.

Next, in the third mode illustrated in FIG. 3A, the second and fourth switching element Q2 and Q4 of the first conversion circuit 1, the fifth and seventh switching element Q5 and Q7 of the second conversion circuit 2, and the first and fourth switches Q11 and Q14 of the third conversion circuit 5 are in the on state. In this state, as illustrated in FIG. 3A, the reference potential point 100 is electrically connected to the third output point 105 via the fourth switching element Q4, the first capacitor C1, the second switching element Q2, the inductor 61, and the first switch Q11. The reference potential point 100 is electrically connected to the fourth output point 106 via the fifth switching element Q5, the second capacitor C2, the seventh switching element Q7, the inductor 62, and the fourth switch Q14.

Therefore, in the third mode, the potential of the first output point 103 is higher than the potential (0[V]) of the reference potential point 100 by the voltage (E/4[V]) across the first capacitor C1, i.e., the potential of the first output point 103 is E/4 (=0+E/4)[V]. In the third mode, the potential of the second output point 104 is lower than the potential (0[V]) of the reference potential point 100 by the voltage (E/4[V]) across the second capacitor C2, i.e., the potential of the second output point 104 is −E/4 (=0−E/4)[V]. In this case, the potential of the third output point 105 is a potential obtained by subtracting the voltage across the inductor 61 from the potential of the first output point 103, and the potential of the fourth output point 106 is a potential obtained by adding the voltage across the inductor 62 to the potential of the second output point 104.

Figure 3B:
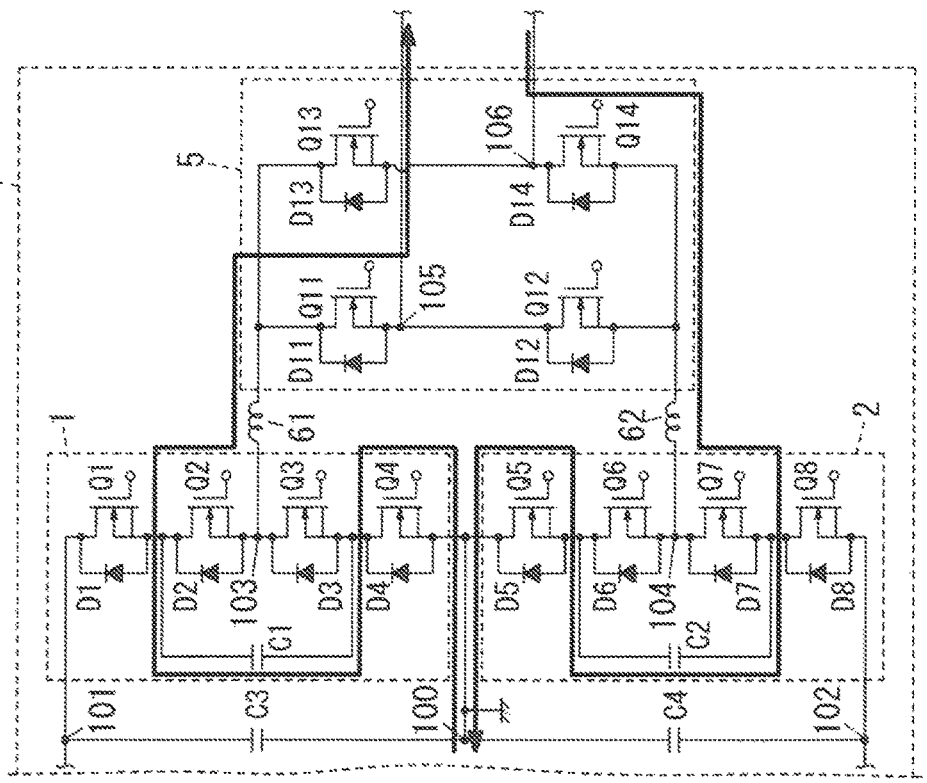

Next, in the fourth mode illustrated in FIG. 3B, the third and fourth switching elements Q3 and Q4 of the first conversion circuit 1, the fifth and sixth switching elements Q5 and Q6 of the second conversion circuit 2 and the first and fourth switches Q11 and Q14 of the third conversion circuit 5 are in the on state. In this state, as illustrated in FIG. 3B, the reference potential point 100 is electrically connected to the third output point 105 via the fourth switching element Q4, the third switching element Q3, the inductor 61, and the first switch Q11. The reference potential point 100 is electrically connected to the fourth output point 106 via the fifth switching element Q5, the sixth switching element Q6, the inductor 62, and the fourth switch Q14.

Therefore, the first output point 103 has the same potential (0[V]) as the reference potential point 100, and the second output point 104 also has the same potential (0[V]) as the reference potential point 100. In this case, the potential of the third output point 105 is a potential obtained by subtracting the voltage across the inductor 61 from the potential of the first output point 103, and the potential of the fourth output point 106 is a potential obtained by adding the voltage across the inductor 62 to the potential of the second output point 104.

In summary, the power-converting device 10 switches between the first to fourth modes, thereby changing the potential of the first output point 103 and the potential of the second output point 104 in a plurality of stages. When attention is focused on each of the first conversion circuit 1 and the second conversion circuit 2, each of the first conversion circuit 1 and the second conversion circuit 2 switches the output voltage between three stages.

That is, the first conversion circuit 1 switches the magnitude of the voltage generated between the first output point 103 and the reference potential point 100 (hereinafter referred to as a "first output voltage") between three stages which are zero, a first level, and a second level. More specifically, the potential of the first output point 103 in the first mode is E/2[V], and therefore, the first output voltage is E/2[V] which is the second level. In both of the second mode and the third mode, the potential of the first output point 103 is E/4[V], and therefore, the first output voltage is E/4[V] which is the first level. In the fourth mode, the potential of the first output point 103 is 0[V], and therefore, the first output voltage is zero (0)[V].

In this way, the first conversion circuit 1 uses the first capacitor C1 as a flying capacitor and switches on/off the first to fourth switching elements Q1 to Q4 to output the first output voltage in three stages which are zero, the first level, and the second level. In other words, the first conversion circuit 1 converts the direct-current voltage applied between the first input point 101 and the reference potential point 100 into a first output voltage at any one of zero (0[V]), the first level (E/4[V]), and the second level (E/2[V]) and outputs the first output voltage. The first capacitor C1 is charged in the second mode and discharged in the third mode, but performing switching between the first to fourth modes at a relatively high frequency allows the voltage across the first capacitor C1 during the basic operation to be considered to be substantially constant (E/4[V]).

The second conversion circuit 2 switches the magnitude of the voltage generated between the second output point 104 and the reference potential point 100 (hereinafter referred to as a "second output voltage") between three stages which are zero, the third level, and the fourth level. More specifically, the potential of the second output point 104 in the first mode is −E/2[V], and therefore, the second output voltage is −E/2[V] which is the fourth level. In both of the second mode and the third mode, the potential of the second output point 104 is −E/4[V], and therefore, the second output voltage is −E/4[V] which is the third level. In the fourth mode, the potential of the second output point 104 is 0[V], and therefore, the second output voltage is zero (0)[V].

In this way, the second conversion circuit 2 uses the second capacitor C2 as a flying capacitor and switches on/off the fifth to eighth switching elements Q5 to Q8, thereby outputting the second output voltage in three stages which are zero, the third level, and the fourth level. In other words, the second conversion circuit 2 converts the direct-current voltage applied between the second input point 102 and the reference potential point 100 into a second output voltage at any one of zero (0[V]), the third level (−E/4[V]), and the fourth level (−E/2[V]) and outputs the second output voltage. The second capacitor C2 is charged in the second mode and discharged in the third mode, but performing switching between the first to fourth modes at a relatively high frequency allows the voltage across the second capacitor C2 during the basic operation to be considered to be substantially constant (E/4[V]).

In the first to fourth modes, the first and fourth switches Q11 and Q14 are continuously in the on state, and the second and third switches Q12 and Q13 are continuously in the off state in the third conversion circuit 5. Thus, the first output point 103 of the first conversion circuit 1 is electrically connected to the third output point 105 via the inductor 61 and the first switch Q11. The second output point 104 of the second conversion circuit 2 is electrically connected to the fourth output point 106 via the inductor 62 and the fourth switch Q14.

Thus, in the first to fourth modes, the power-converting device 10 outputs a voltage such that the third output point 105 is a high potential side and the fourth output point 106 is a low potential side. At this time, the power-converting device 10 switches the voltage output between the first output point 103 and the second output point 104 between three stages, i.e., E[V] (first mode), E/2[V] (second and third modes), and 0[V] (fourth mode). The output of the power-converting device 10 at this time corresponds to a half wave on a positive polarity side of the wave form (sine wave) of an alternate current voltage output from the power-converting device 10, i.e., a voltage corresponding to the potential difference between the third output point 105 and the fourth output point 106 (hereinafter referred to as a "third output voltage").

Here, the controller 9 switches on/off the first to eighth switching elements Q1 to Q8 by a Pulse Width Modulation (PWM) signal, thereby realizing the first to fourth modes.

More specifically, the controller 9 repeats operation of performing switching in the order of the fourth mode, the third mode, and the second mode (fourth mode-third mode-second mode-fourth mode-third mode-second mode-fourth mode . . . ). The controller 9 equalizes the time length of the third mode and the time length of the second mode, thereby keeping discharging and charging of the first capacitor C1 and the second capacitor C2 in balance. The third output voltage varies in the range of 0[V] to E/2[V].

The controller 9 also repeats operation of performing switching in the order of the second mode, the third mode, and the first mode (second mode-third mode-first mode-second mode-third mode-first mode-second mode . . . ). The controller 9 equalizes the time length of the third mode and the time length of the second mode, thereby keeping discharging and charging of the first capacitor C1 and the second capacitor C2 in balance. The third output voltage varies in the range of E/2[V] to E[V].

The controller 9 performs the above-described switching between the first to fourth modes while changing the duty cycle (i.e., duty ratio) of the PWM signal, thereby generating the third output voltage approximated to the half wave (on a positive polarity side) of the sine wave.

In the fifth to eighth modes, the power-converting device 10 operates correspondingly to a half wave on a negative polarity side of the wave form (sine wave) of the third output voltage and outputs the third output voltage such that the third output point 105 is a low potential side and the fourth output point 106 is a high potential side. That is, in the fifth to eighth modes, the second and third switches Q12 and Q13 are continuously in the on state, and the first and fourth switches Q11 and Q14 are in the off state in the third conversion circuit 5.

Operation of the first conversion circuit 1 and the second conversion circuit 2 in each of the fifth to eighth modes of is identical with that in any of the first to fourth modes.

Figure 4A:
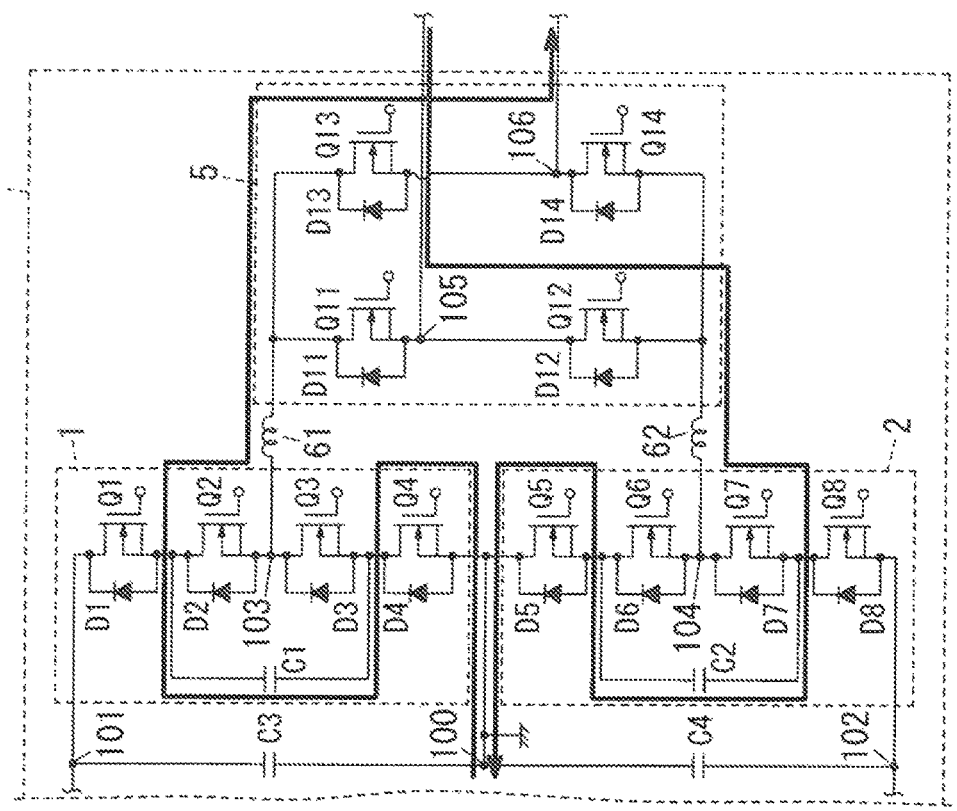
FIGS. 4A and 4B are views illustrating the operation of the power-converting device according to the first embodiment.

That is, in the fifth mode illustrated in FIG. 4A, the third and fourth switching elements Q3 and Q4 of the first conversion circuit 1 and the fifth and sixth switching elements Q5 and Q6 of the second conversion circuit 2 are in the on states in a similar manner to the fourth mode. In this state, as illustrated in FIG. 4A, the reference potential point 100 is electrically connected to the fourth output point 106 via the fourth switching element Q4, the third switching element Q3, the inductor 61, and the third switch Q13. The reference potential point 100 is also electrically connected to the third output point 105 via the fifth switching element Q5, the sixth switching element Q6, the inductor 62, and the second switch Q12.

Thus, the first output point 103 has the same potential (0[V]) as the reference potential point 100, and the second output point 104 also has the same potential (0[V]) as the reference potential point 100. In this case, the potential of the fourth output point 106 is a potential obtained by subtracting the voltage across the inductor 61 from the potential of the first output point 103, and the potential of the third output point 105 is a potential obtained by adding the voltage across the inductor 62 to the potential of the second output point 104.

Figure 4B:
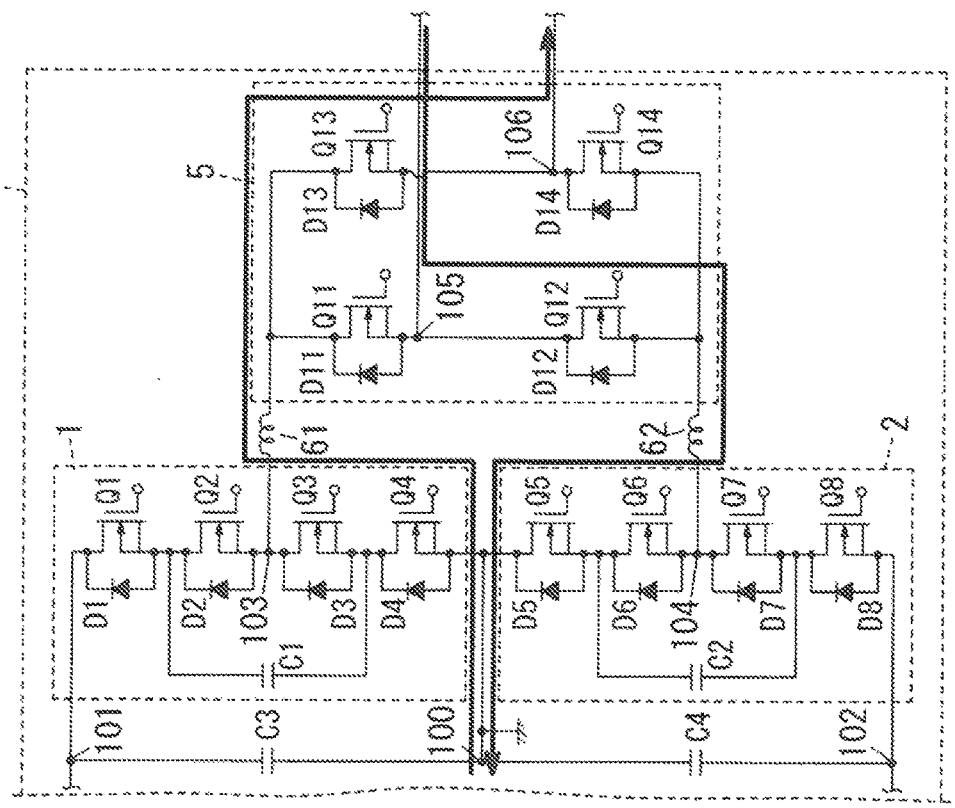

Next, in the sixth mode illustrated in FIG. 4B, the second and fourth switching elements Q2 and Q4 of the first conversion circuit 1 and the fifth and seventh switching elements Q5 and Q7 of the second conversion circuit 2 are in the on states in a similar manner to the third mode. In this state, as illustrated in FIG. 4B, the reference potential point 100 is electrically connected to the fourth output point 106 via the fourth switching element Q4, the first capacitor C1, the second switching element Q2, the inductor 61, and the third switch Q13. The reference potential point 100 is also electrically connected to the third output point 105 via the fifth switching element Q5, the second capacitor C2, the seventh switching element Q7, the inductor 62, and the second switch Q12.

Thus, the potential of the first output point 103 is E/4 (=0+E/4)[V], and the potential of the second output point 104 is −E/4 (=0−E/4)[V]. In this case, the potential of the fourth output point 106 is a potential obtained by subtracting the voltage across the inductor 61 from the potential of the first output point 103, and the potential of the third output point 105 is a potential obtained by adding the voltage across the inductor 62 to the potential of the second output point 104.

Figure 5A:
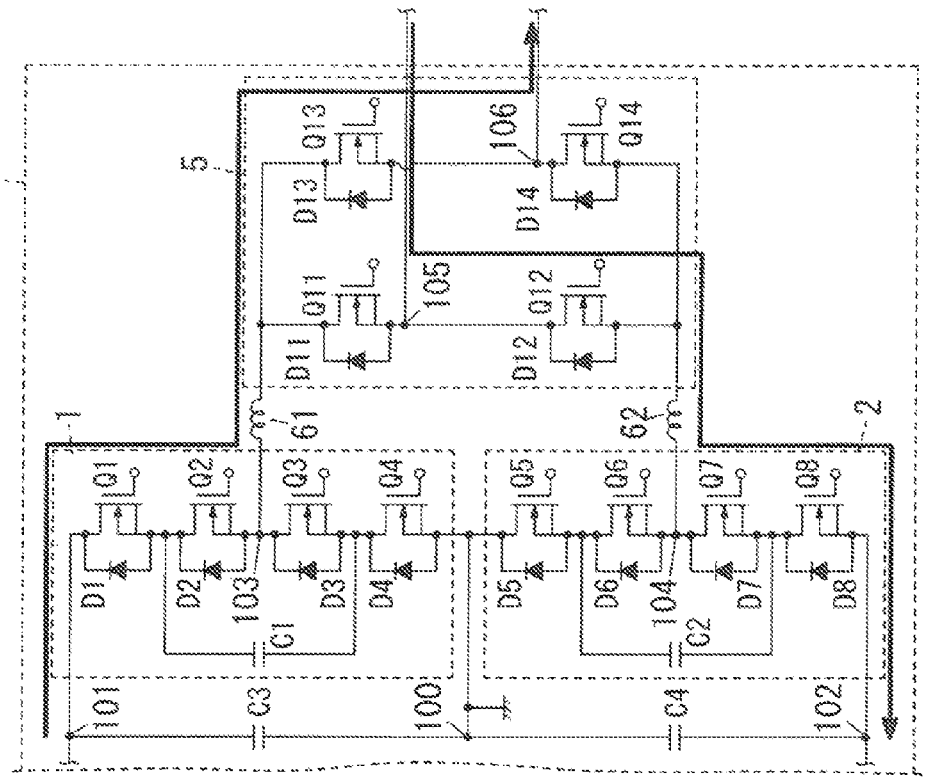
FIGS. 5A and 5B are views illustrating the operation of the power-converting device according to the first embodiment.

Next, in the seventh mode illustrated in FIG. 5A, the first and third switching elements Q1 and Q3 of the first conversion circuit 1 and the sixth and eighth switching elements Q6 and Q8 of the second conversion circuit 2 are in the on states in a similar manner to the fourth mode. In this state, as illustrated in FIG. 5A, the first input point 101 is electrically connected to the fourth output point 106 via the first switching element Q1, the first capacitor C1, the third switching element Q3, the inductor 61, and the third switch Q13. The second input point 102 is also electrically connected to the third output point 105 via the eighth switching element Q8, the second capacitor C2, the sixth switching element Q6, the inductor 62, and the second switch Q12.

Thus, the potential of the first output point 103 is E/4 (=E/2−E/4)[V], and the potential of the second output point 104 is −E/4 (=−E/2+E/4)[V]. In this case, the potential of the fourth output point 106 is a potential obtained by subtracting a voltage across the inductor 61 from the potential of the first output point 103, and the potential of the third output point 105 is a potential obtained by adding a voltage across the inductor 62 to the potential of the second output point 104.

Figure 5B:
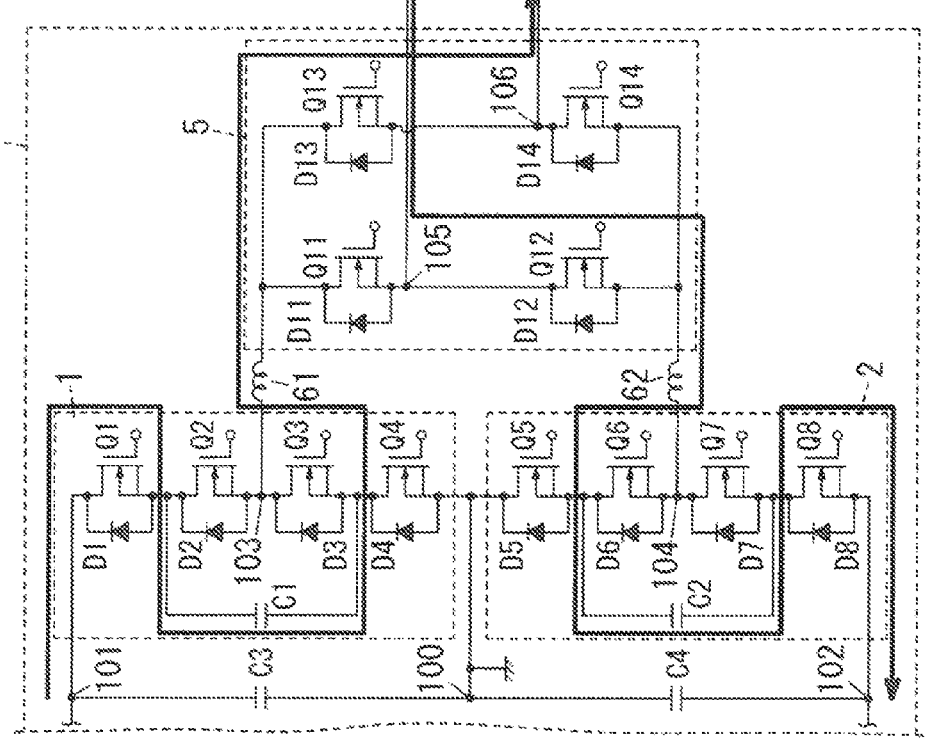

Next, in the eighth mode illustrated in FIG. 5B, the first and second switching elements Q1 and Q2 of the first conversion circuit 1 and the seventh and eighth switching elements Q7 and Q8 of the second conversion circuit 2 are in the on states in a similar manner to the first mode. In this state, as illustrated in FIG. 5B, the first input point 101 is electrically connected to the fourth output point 106 via the first switching element Q1, the second switching element Q2, the inductor 61, and the third switch Q13. The second input point 102 is also electrically connected to the third output point 105 via the eighth switching element Q8, the seventh switching element Q7, the inductor 62, and the second switch Q12.

Thus, the first output point 103 is equivalent in potential (E/2[V]) to the first input point 101, and the second output point 104 is equivalent in potential (−E/2[V]) to the second input point 102. In this case, the potential of the fourth output point 106 is a potential obtained by subtracting a voltage across the inductor 61 from the potential of the first output point 103, and the potential of the third output point 105 is a potential obtained by adding a voltage across the inductor 62 to the potential of the second output point 104.

Thus, in the fifth to eighth modes, the power-converting device 10 switches the voltage output between the second output point 104 and the first output point 103 between three stages which are 0[V] (fifth mode), −E/2[V] (sixth and seventh modes), and −E[V] (eighth mode). The output of the power-converting device 10 at this time corresponds to a half wave on a negative polarity side of the wave form (sine wave) of an alternate current voltage output from the power-converting device 10, i.e., a voltage corresponding to the potential difference between the third output point 105 and the fourth output point 106 (third output voltage).

Here, the controller 9 switches on/off the first to eighth switching elements Q1 to Q8 by the PWM signal, thereby realizing the fifth to eighth modes. More specifically, the controller 9 repeats operation of performing switching in the order of the fifth mode, the seventh mode, and the sixth mode (fifth mode-seventh mode-sixth mode-fifth mode-seventh mode-sixth mode-fifth mode . . . ). The controller 9 equalizes the time length of the seventh mode and the time length of the sixth mode, thereby keeping discharging and charging of the first capacitor C1 and the second capacitor C2 in balance. The third output voltage varies in the range of 0[V] to −E/2 [V].

The controller 9 repeats operation of performing switching in the order of the sixth mode, the seventh mode, and the eighth mode (sixth mode-seventh mode-eighth mode-sixth mode-seventh mode-eighth mode-sixth mode . . . ). The controller 9 equalizes the time length of the seventh mode and the time length of the sixth mode, thereby keeping discharging and charging of the first capacitor C1 and the second capacitor C2 in balance. The third output voltage varies in the range of −E/2[V] to −E[V].

The controller 9 performs the above-described switching of the fifth to eighth modes while changing the duty cycle of the PWM signal, thereby generating the third output voltage approximated to the half wave (on a negative polarity side) of the sine wave.

Thus, the power-converting device 10 of the present embodiment alternately repeats operation in the first to fourth modes and operation in the fifth to eighth modes described above, thereby outputting a third output voltage having a wave form approximated to the sine wave.

Exactly speaking, the third output voltage is switched between five stages, i.e., E[V], E/2[V], 0[V], and −E/2[V], −E[V].

The above-described operation keeps the voltage applied to each of the first to eighth switching elements Q1 to Q8 during basic operation of the power-converting device 10 of the present embodiment equal to or lower than E/4[V] of <Configuration of Voltage-Regulating Circuit>

Figure 6:
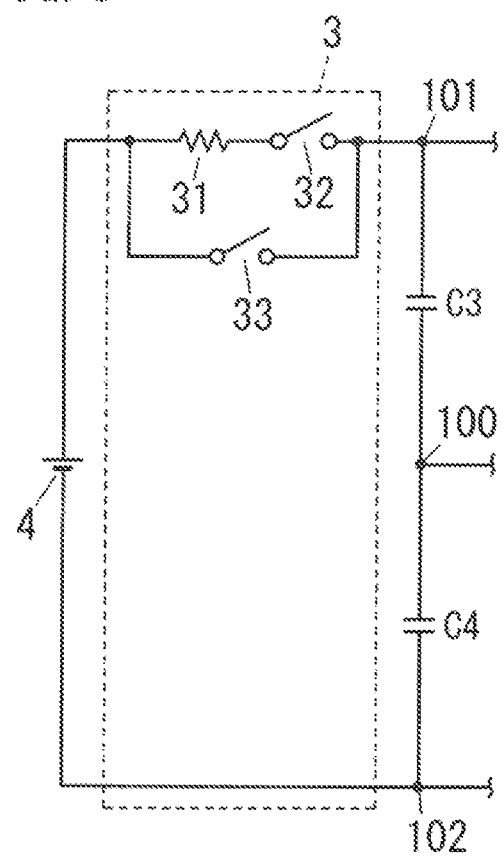
FIG. 6 is a circuit diagram illustrating a voltage-regulating circuit according to the first embodiment.

As illustrated in FIG. 6, the voltage-regulating circuit 3 of the present embodiment includes a resistor 31, a first adjustment switch (first switching element) 32, and a second adjustment switch (second switching element) 33.

The resistor 31 and the first adjustment switch 32 are electrically connected in series with each other between the first input point 101 and an output end on a high potential side of the direct current power supply 4. The second adjustment switch 33 is electrically connected in parallel with a series circuit of the resistor 31 and the first adjustment switch 32 between the first input point 101 and the output end on the high potential side of the direct current power supply 4. The controller 9 controls to individually turn on/off the first adjustment switch 32 and the second adjustment switch 33.

The voltage-regulating circuit 3 electrically connects the third capacitor C3 and the fourth capacitor C4 to the direct current power supply 4 via the resistor 31 with the first adjustment switch 32 being in an on state and the second adjustment switch 33 being in an off state. At this time, the voltage across each of the third capacitor C3 and the fourth capacitor C4 increases over time after turning on the direct current power supply 4 depending on a time constant determined by the resistance value of the resistor 31 and the capacitance values of the third capacitor C3 and the fourth capacitor C4. In other words, the voltage-regulating circuit 3 increases the magnitude of the applied voltage to the first conversion circuit 1 and the second conversion circuit 2 over time.

When the first adjustment switch 32 is in an off state, and the second adjustment switch 33 is in an on state, the voltage-regulating circuit 3 connects the third capacitor C3 and the fourth capacitor C4 directly to the direct current power supply 4.

Although detailed description will be given later, the controller 9 turns on the first adjustment switch 32 and turns off the second adjustment switch 33 during the start time period T1, and turns off the first adjustment switch 32 and turns on the second adjustment switch 33 during a normal time period T2 (see FIG. 10). Here, the start time period T1 may be a time period from turning on of the direct current power supply 4 to completion of charging the third capacitor C3 and the fourth capacitor C4.

The resistor 31 and the first adjustment switch 32 may of course be electrically connected in series with each other between an output end on a low potential side of the direct current power supply 4 and the second input point 102 instead of being electrically connected in series with each other between an output end on a high potential side of the direct current power supply 4 and the first input point 101.

<Start Operation of Power-Converting Device>

The start operation of the power-converting device 10 here means operation of the power-converting device 10 from a time point at which power supply from the direct current power supply 4 is started to a time point at which a normal time period T2 for basic operation starts after the start time period T1 has elapsed. In the case of the direct current power supply 4 being a photovoltaic generator, the power-converting device 10 does not operate while the output of the photovoltaic generator is less than or equal to a specified value, and when the output of the photovoltaic generator exceeds the specified value and the direct current power supply 4 thus starts supplying power to the power-converting device 10, the power-converting device 10 starts its start operation.

The power-converting device 10 according to the present embodiment includes the voltage-regulating circuit 3 to increase the applied voltage to the first conversion circuit 1 and the second conversion circuit 2 during the start time period T1 immediately after turning on of the direct current power supply 4, thereby keeping the voltage applied to each of the first to eighth switching elements Q1 to Q8 low. With the power-converting device 10, the withstand voltages of the switching elements (Q1 to Q8) can be reduced.

Figure 7:
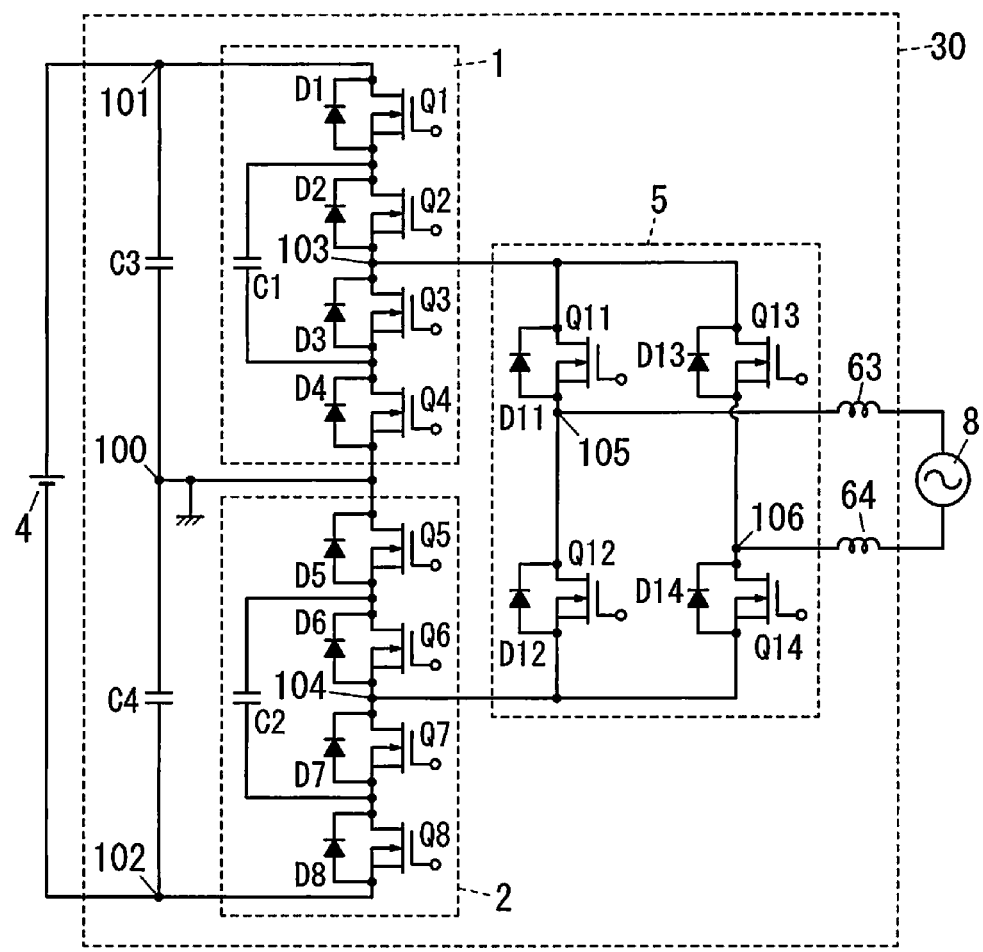
FIG. 7 is a circuit diagram illustrating the configuration of a power-converting device according to a comparative example.

A mechanism through which the voltage applied to each of the first to eighth switching elements Q1 to Q8 can be kept low will be described with reference to a comparative example as illustrated in FIG. 7 in which a power-converting device 30 includes no voltage-regulating circuit.

As illustrated in FIG. 7, the power-converting device 30 of the comparative example includes no voltage-regulating circuit, and therefore, both ends of a direct current power supply 4 are individually connected directly to a first input point 101 and a second input point 102 of the power-converting device 30. The power-converting device 30 includes a pair of inductors 63 and 64 in place of the inductor 61 (see FIG. 1) between the first output point 103 and the third conversion circuit 5 and the inductor 62 (see FIG. 1) between the second output point 104 and the third conversion circuit 5. The inductor 63 is electrically connected between a third output point 105 and a system power supply 8, and the inductor 64 is electrically connected between a fourth output point 106 and the system power supply 8. In FIG. 7, a controller is omitted.

The first conversion circuit 1 and the second conversion circuit 2 substantially have the same configuration as described above. Therefore, as illustrated in FIG. 8, the start operation of the power-converting device 10 will be described below with attention being focused on the first conversion circuit 1.

Note that the same applies to the second conversion circuit 2 when the first capacitor C1 is replaced with the second capacitor C2, and the first to fourth switching elements Q1 to Q4 are replaced with the fifth to eighth switching elements Q5 to Q8. Here, the first switching element Q1 is replaced with the eighth switching element Q8, and the second switching element Q2 is replaced with the seventh switching element Q7. The third switching element Q3 is replaced with the sixth switching element Q6, and the fourth switching element Q4 is replaced with the fifth switching element Q5.

Figure 8:
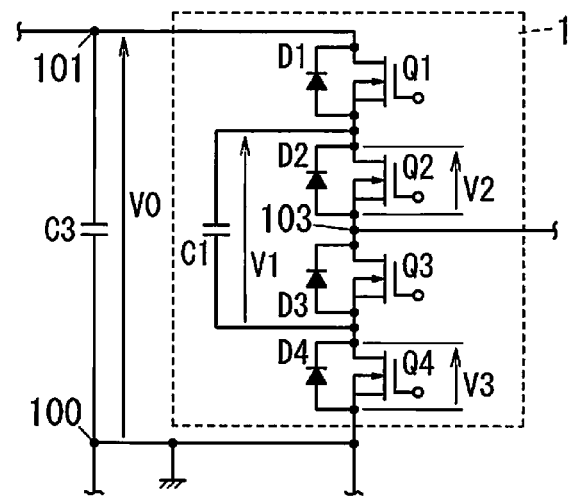
FIG. 8 is a circuit diagram illustrating a first conversion circuit according to the first embodiment.

In the following description, as illustrated in FIG. 8, the voltage across the third capacitor C3 is denoted by "V0," the voltage across the first capacitor C1 is denoted by "V1," and the voltage across the second switching element Q2 is denoted by "V2," and the voltage across the fourth switching element Q4 is denoted by "V3."

First, the power-converting device 30 of the comparative example will be described. The first capacitor C1 is not charged at a starting time point, and therefore, the power-converting device 30 has to charge the first capacitor C1 in the second mode or the seventh mode. However, in the second mode and in the seventh mode, the first and third switching elements Q1 and Q3 of the first conversion circuit 1 and the sixth and eighth switching elements Q6 and Q8 of the second conversion circuit 2 are in the on state.

Therefore, in each of the second and seventh modes, the voltage applied to the first and third switching elements Q1 and Q3 is substantially 0[V], and the voltage V2 across the second switching element Q2 is equivalent to the voltage V1 across the first capacitor C1 (V2=V1). The voltage V3 across the fourth switching element Q4 is a voltage obtained by subtracting the voltage V1 across the first capacitor C1 from the voltage V0 across the third capacitor C3 (V3=V0−V1). The voltage V0 across the third capacitor C3 is a voltage (E/2[V]) obtained by dividing the output voltage E[V] of the direct current power supply 4 by the third capacitor C3 and the fourth capacitor C4, and therefore, the voltage V3 across the fourth switching element Q4 is E/2[V]−V1.

Figure 9:
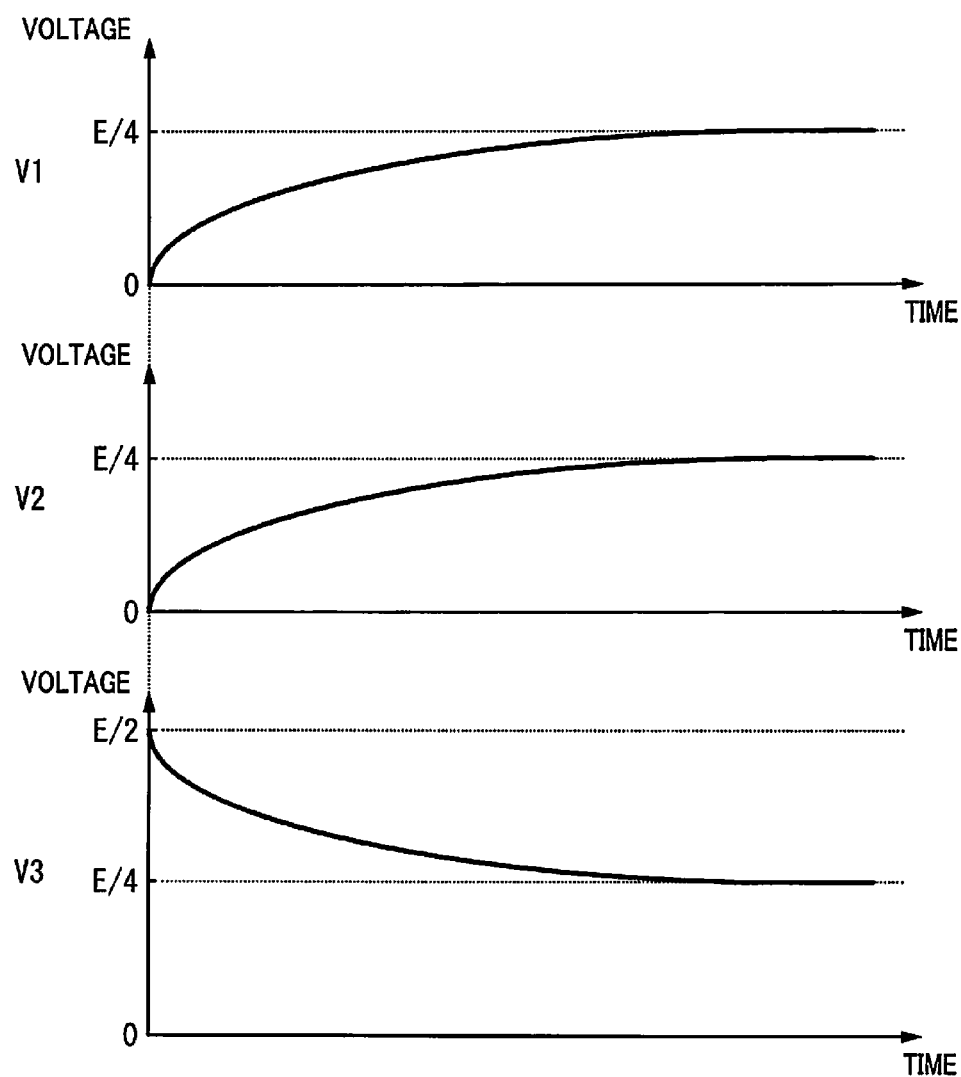
FIG. 9 is a view illustrating operation of the power-converting device according to the comparative example.

The start operation of the power-converting device 30 results in the voltage V1 across the first capacitor C1, the voltage V2 across the second switching element Q2, and the voltage V3 across the fourth switching element Q4 as shown in FIG. 9. That is, in the start operation of the power-converting device 30 of the comparative example, the voltage V3 across the fourth switching element Q4 is E/2[V]. In FIG. 9, the abscissa is a time axis, and voltages are shown along the ordinate.

In the power-converting device 10 according to the present embodiment, the voltage V2 across the second switching element Q2 is equal to the voltage V1 across the first capacitor C1 (V2=V1) in each of the second and seventh modes in a manner similar to the comparative example. The voltage V3 across the fourth switching element Q4 is a voltage obtained by subtracting the voltage V1 across the first capacitor C1 from the voltage V0 across the third capacitor C3 (V3=V0−V1).

Note that the power-converting device 10 according to the present embodiment includes the voltage-regulating circuit 3 to increase the voltage applied to the first conversion circuit 1 and the second conversion circuit 2 during the start time period T1 immediately after turning on of the direct current power supply 4. Thus, as illustrated in FIG. 10, the voltage V0 across the third capacitor C3 increases over time. In FIG. 10, the abscissa is a time axis, and voltages are shown along the ordinate.

Figure 10:
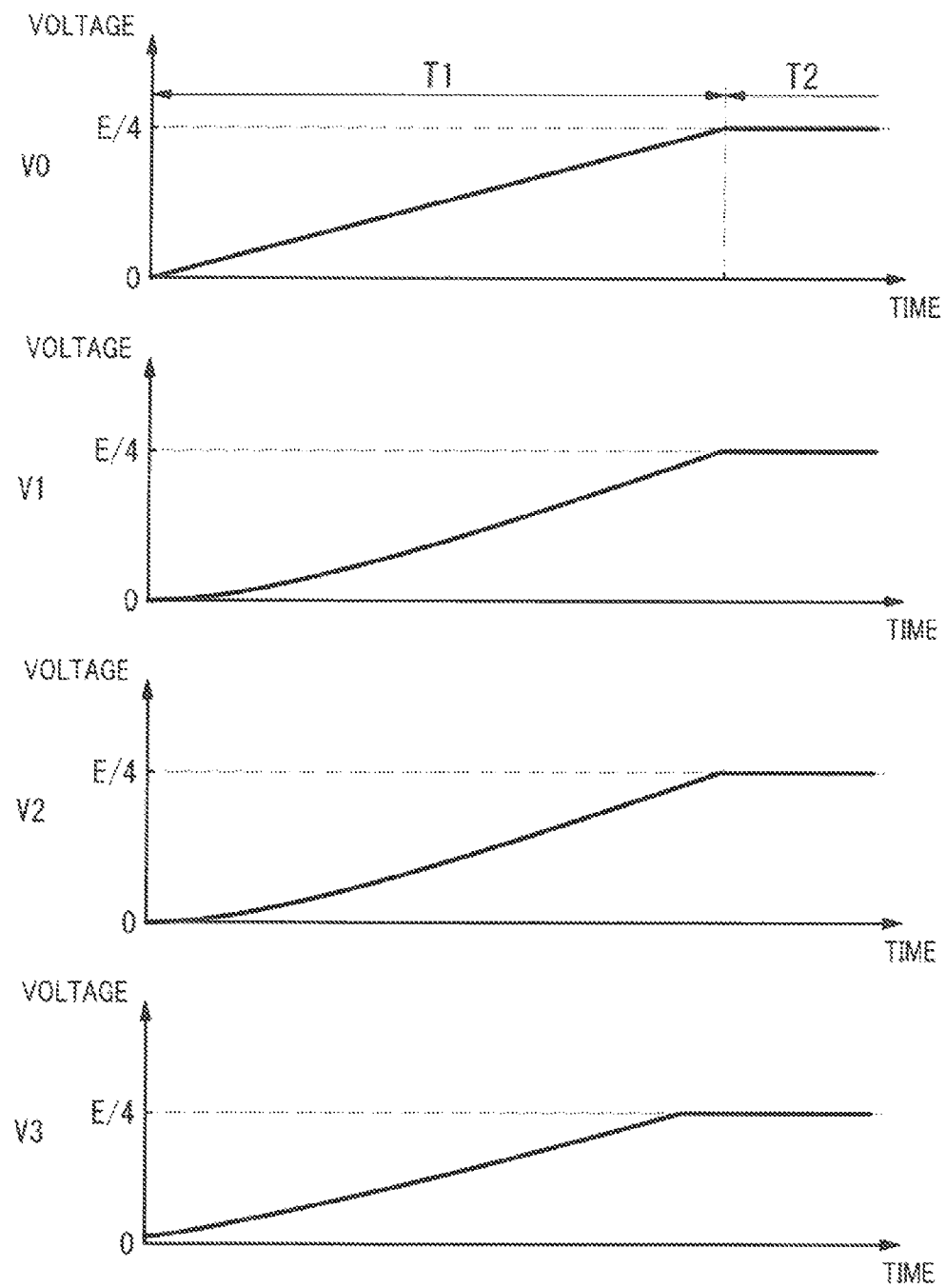
FIG. 10 is a view illustrating the operation of the power-converting device according to the first embodiment.

The start operation of the power-converting device 10 results in the voltage V1 across the first capacitor C1, the voltage V2 across the second switching element Q2, and the voltage V3 across the fourth switching element Q4 as illustrated in FIG. 10. That is, the power-converting device 10 of the present embodiment keeps the voltage V3 across the fourth switching element Q4 equal to or lower than E/4[V] even in the start operation.

The power-converting device 10 of the present embodiment is configured such that the third conversion circuit 5 keeps at least two of the first to fourth switches Q11 to Q14 in the on state during the start time period T1 to form a current path between the first output point 103 and the second output point 104. The current path here includes the inductors 61 and 62. Specifically, the third conversion circuit 5 keeps at least one pair of a pair of the first and second switches Q11 and Q12 and a pair of third and fourth switches Q13 and Q14 in the on state during the start time period T1. The third conversion circuit 5 may keep both of the pairs (i.e., all of the first to fourth switches Q11 to Q14) in the on state.

That is, during the start time period T1, the power-converting device 10 does not operate in the first to eighth modes for all of the first to third conversion circuits but operates in the first to eighth modes only for the first conversion circuit 1 and the second conversion circuit 2. At this time, the third conversion circuit 5 forms a current path including the inductors 61 and 62 between the first output point 103 and the second output point 104. The power-converting device 10 uses the current path as a charging path, thereby allowing the first capacitor C1 and the second capacitor C2 to be charged even when the third output point 105 is electrically isolated from the fourth output point 106.

Thus, the power-converting device 10 allows the first capacitor C1 and the second capacitor C2 to be charged even when the third output point 105 and the fourth output point 106 are not connected to the system power supply 8.

In the power conditioner 20 including the disconnection device 7, the disconnection device 7 is opened during the start time period T1, thereby disconnecting the first output point 103 and the second output point 104 from the system power supply 8. Thus, during the start time period T1 of the power-converting device 10, the voltage from the system power supply 8 is applied to neither the first conversion circuit 1 nor the second conversion circuit 2.

The power-converting device 10 is only required to charge the first capacitor C1 and the second capacitor C2 during the start time period T1. Therefore, it is not essential for the power-converting device 10 to operate only in the second mode or only in the seventh mode. That is, the power-converting device 10 may switch between the above-described first to eighth modes even during the start time period T1 as during the normal time period T2.

<Effects>

The power-converting device 10 of the present embodiment described above includes the voltage-regulating circuit 3, and therefore, the applied voltage to the first conversion circuit 1 and the second conversion circuit 2 increases during the start time period T1 immediately after turning on of the direct current power supply 4. Thus, until the first capacitor C1 and the second capacitor C2 are charged to the specified voltage, the applied voltage to the first conversion circuit 1 and the second conversion circuit 2 is kept low, thereby keeping the applied voltage to each of the first to eighth switching elements Q1 to Q8 low. Thus, the power-converting device 10 can keep the applied voltage to each of the first to eighth switching elements Q1 to Q8 equal to or lower than E/4[V] not only during the normal time period T2 during which the regular operation is performed but also during the start time period T1 during which the first capacitor C1 and the second capacitor C2 are not charged. This provides an advantage that the withstand voltages of the switching elements (Q1 to Q8) can be reduced. The regular operation here means operation of the power-converting device 10 after a lapse of the start time period T1, that is, after the first capacitor C1 and the second capacitor C2 have been charged to the specified voltage, and the regular operation here is synonymous with the above-described basic operation.

Moreover, the power-converting device 10 preferably includes the third conversion circuit 5 and the inductor (at least one of the inductors 61 and 62) as illustrated in the present embodiment. The third conversion circuit 5 is electrically connected between the first output point 103 and the second output point 104, includes the first to fourth switches Q11 to Q14 in a full bridge configuration, and converts a voltage generated between the first output point 103 and the second output point 104 into an alternate current voltage to output the alternate current voltage. The inductor is electrically connected between the third conversion circuit 5 and at least one of the first output point 103 and the second output point 104. In this case, the third conversion circuit 5 is configured to turn on at least two of the first to fourth switches Q11 to Q14 during the start time period T1 to form a current path including the inductor between the first output point 103 and the second output point 104.

With this configuration, the power-converting device 10 allows the first capacitor C1 and the second capacitor C2 to be charged even when the first output point 103 and the second output point 104 are not connected to the system power supply 8. The inductors 61 and 62 included in the charging path for the first capacitor C1 and the second capacitor C2 prevent a flow of an overcurrent.

The power-converting device 10 preferably further includes the third capacitor C3 and the fourth capacitor C4 electrically connected in series with each other between the first input point 101 and the second input point 102 as in the present embodiment. In this case, the reference potential point 100 is the connection point of the third capacitor C3 and the fourth capacitor C4.

When a single direct current power supply 4 is connected between the first input point 101 and the second input point 102 in this configuration, a voltage is divided by the third capacitor C3 and the fourth capacitor C4 to obtain divided voltages, and the divided voltages are individually applied to the first conversion circuit 1 and the second conversion circuit 2.

The voltage-regulating circuit 3 of the power-converting device 10 preferably includes the resistor 31, the first adjustment switch (first switching element) 32, and the second adjustment switch (second switching element) 33 as in the present embodiment. In this case, the resistor 31 and the first adjustment switch 32 are electrically connected in series with each other between the first input point 101 and an output end on a high potential side of the direct current power supply 4 or between the second input point 102 and an output end on a low potential side of the direct current power supply 4. The second adjustment switch 33 is electrically connected in parallel with a series circuit of the resistor 31 and the first adjustment switch 32. In this case, the power-converting device 10 further includes the controller 9 configured to individually control on/off of the first adjustment switch 32 and the second adjustment switch 33. The controller 9 is configured to turn on the first adjustment switch 32 and to turn off the second adjustment switch 33 during the start time period T1, and to turn off the first adjustment switch 32 and to turn on the second adjustment switch 33 after the start time period T1.

With this configuration, the first adjustment switch 32 is in the on state during the start time period T1, thereby electrically connecting the third capacitor C3 and the fourth capacitor C4 to the direct current power supply 4 via the resistor 31. Thus, while the circuit configuration is simple, the magnitude of the applied voltage to the first conversion circuit 1 and the second conversion circuit 2 increases depending on the time constant determined by the resistance value of the resistor 31 and the capacitance values of the third capacitor C3 and the fourth capacitor C4.

According to the power conditioner 20 of the present embodiment, opening (disconnecting) the disconnection device 7 electrically disconnects the first conversion circuit 1 and the second conversion circuit 2 from the system power supply 8. Thus, when the power conditioner 20 opens the disconnection device 7 during the start time period T1, no voltage is applied to the first to eighth switching elements Q1 to Q8 from the system power supply 8, and therefore, the voltage applied to each of the first to eighth switching elements Q1 to Q8 is kept low.

(Second Embodiment)

Figure 11:
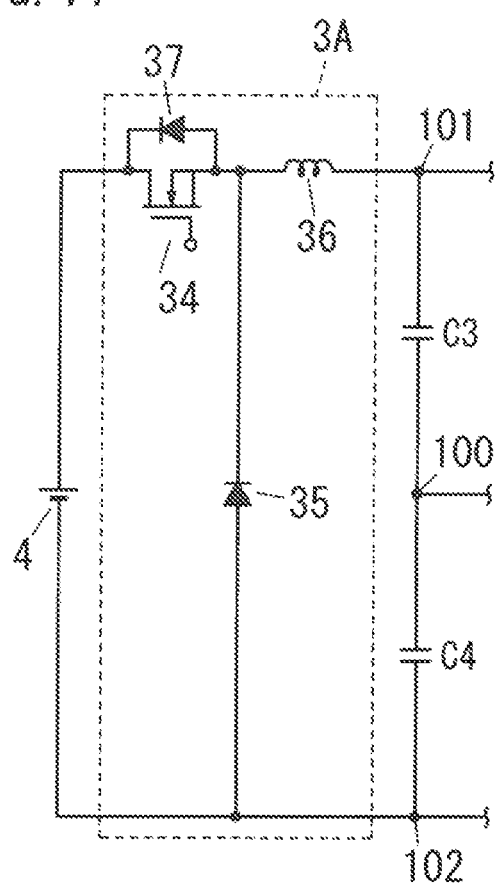
FIG. 11 is a circuit diagram illustrating a voltage-regulating circuit according to a second embodiment.

As illustrated in FIG. 11, the configuration of a voltage-regulating circuit 3A of a power-converting device 10 according to the present embodiment is different from that of the voltage-regulating circuit 3 of the first embodiment. The same components as those in the first embodiment are hereinafter denoted by the same reference symbols and the description thereof will be omitted.

The voltage-regulating circuit 3A of the present embodiment is a step-down chopper circuit. As illustrated in FIG. 11, the voltage-regulating circuit 3A includes a switch element 34, a diode 35, an inductor 36, and a diode 37. Here, the switch element 34 is a depletion type n-channel MOSFET, and the diode 37 is a parasitic diode of the switch element 34.

The switch element 34 and the diode 35 are electrically connected in series with each other between both ends of a direct current power supply 4 such that the switch element 34 is on a high potential side of the direct current power supply 4. The diode 35 has an anode connected to a low potential side of the direct current power supply 4 and a cathode connected to the source of the switch element 34. The inductor 36 is electrically connected between the source of the switch element 34 and a first input point 101.

The voltage-regulating circuit 3A having the above-described configuration changes the duty ratio of the switch element 34 during a start time period T1 to increase an applied voltage to the first conversion circuit 1 and the second conversion circuit 2 over time. Thus, the voltage-regulating circuit 3A preferably controls the voltage V3 across a fourth switching element Q4 (see FIG. 8) so as not to exceed E/4[V] during the start time period T1.

According to the configuration of the present embodiment, a DC/DC converter configured to change the magnitude of a direct-current voltage from the direct current power supply 4 can be used as the voltage-regulating circuit 3A.

Other configurations and functions are similar to those in the first embodiment.

In each embodiment described above, the first to eighth switching elements Q1 to Q8, the first to fourth switches Q11 to Q14, the switch element 34 are not limited to the depletion type n-channel MOSFETs, but may be other semiconductor switches. For example, Insulated Gate Bipolar Transistors (IGBT) or power semiconductor devices including a wide bandgap semiconductor material such as gallium nitride (GaN) may be used.

The invention claimed is:

1. A power-converting device, comprising:
a first conversion circuit electrically connected between a reference potential point and a first input point on a high potential side of a direct current power supply;
a second conversion circuit electrically connected between the reference potential point and a second input point on a low potential side of the direct current power supply; and
a voltage-regulating circuit configured to adjust a magnitude of an applied voltage to the first conversion circuit and the second conversion circuit, wherein
the first conversion circuit includes
first to fourth switching elements electrically connected in series with each other between the first input point and the reference potential point in an order of the first switching element, the second switching element, the third switching element, and the fourth switching element from the first input point, and
a first capacitor electrically connected in parallel with a series circuit of the second switching element and the third switching element,
the first conversion circuit switches a magnitude of a voltage generated between the reference potential point and a first output point between three stages which are zero, a first level, and a second level, the first output point being a connection point of the second switching element and the third switching element,
the second conversion circuit includes
fifth to eighth switching elements electrically connected in series with each other between the reference potential point and the second input point in an order of the fifth switching element, the sixth switching element, the seventh switching element, and the eighth switching element from the reference potential point, and
a second capacitor electrically connected in parallel with a series circuit of the sixth switching element and the seventh switching element,
the second conversion circuit switches a magnitude of a voltage generated between the reference potential point and a second output point between three stages which are zero, a third level, and a fourth level, the second output point being a connection point of the sixth switching element and the seventh switching element, and
the voltage-regulating circuit is configured to increase the magnitude of the applied voltage over time during a start time period from a start of supplying power from the direct current power supply until the first capacitor and the second capacitor are charged to a specified voltage, the power-converting device further comprising:

a third conversion circuit electrically connected between the first output point and the second output point, including first to fourth switches in a full bridge configuration, and configured to convert a voltage generated between the first output point and the second output point into an alternate current voltage and to output the alternate current voltage; and an inductor electrically connected between the third conversion circuit and at least one of the first output point and the second output point, wherein a series circuit of the first switch and the second switch and a series circuit of the third switch and the fourth switch are connected in parallel with each other between the first output point and the second output point, and the third conversion circuit is configured to keep at least one pair of a pair of the first and second switches and a pair of third and fourth switches in an on state during the start time period to form a current path including the inductor between the first output point and the second output point.

2. The power-converting device according to claim 1, further comprising a third capacitor and a fourth capacitor electrically connected in series with each other between the first input point and the second input point, wherein the reference potential point is a connection point of the third capacitor and the fourth capacitor.

3. The power-converting device according to claim 1, wherein the voltage-regulating circuit includes
a resistor,
a first adjustment switch, and
a second adjustment switch, the resistor and the first adjustment switch are electrically connected in series with each other between the first input point and an output end on the high potential side of the direct current power supply or between the second input point and an output end on the low potential side of the direct current power supply, the second adjustment switch is electrically connected in parallel with a series circuit of the resistor and the first adjustment switch, the power-converting device further includes a controller configured to individually control on/off of the first adjustment switch and the second adjustment switch, and the controller is configured to keep the first adjustment switch in an on state and the second adjustment switch in an off state during the start time period, and to keep the first adjustment switch in an off state and the second adjustment switch in an on state after the start time period.

4. The power-converting device according to claim 2, wherein the voltage-regulating circuit includes
a resistor,
a first adjustment switch, and
a second adjustment switch, the resistor and the first adjustment switch are electrically connected in series with each other between the first input point and an output end on the high potential side of the direct current power supply or between the second input point and an output end on the low potential side of the direct current power supply, the second adjustment switch is electrically connected in parallel with a series circuit of the resistor and the first adjustment switch, the power-converting device further includes a controller configured to individually control on/off of the first adjustment switch and the second adjustment switch, and the controller is configured to keep the first adjustment switch in an on state and the second adjustment switch in an off state during the start time period, and to keep the first adjustment switch in an off state and the second adjustment switch in an on state after the start time period.

5. A power conditioner, comprising:

the power-converting device according to claim 1; and a disconnection device electrically connected between a system power supply and each of the first output point and the second output point, wherein the disconnection device is configured to be open during the start time period to keep a state where the first output point and the second output point are disconnected from the system power supply.

6. A power conditioner, comprising:

the power-converting device according to claim 2; and a disconnection device electrically connected between a system power supply and each of the first output point and the second output point, wherein the disconnection device is configured to be open during the start time period to keep a state where the first output point and the second output point are disconnected from the system power supply.

7. A power conditioner, comprising:

the power-converting device according to claim 3; and a disconnection device electrically connected between a system power supply and each of the first output point and the second output point, wherein the disconnection device is configured to be open during the start time period to keep a state where the first output point and the second output point are disconnected from the system power supply.

8. A power conditioner, comprising:

the power-converting device according to claim 4; and a disconnection device electrically connected between a system power supply and each of the first output point and the second output point, wherein the disconnection device is configured to be open during the start time period to keep a state where the first output point and the second output point are disconnected from the system power supply.

* * * * *